(12) United States Patent
Fuente et al.

(10) Patent No.: US 9,792,059 B2
(45) Date of Patent: *Oct. 17, 2017

(54) DYNAMIC RESOURCE ALLOCATION FOR DISTRIBUTED CLUSTER-STORAGE NETWORK

(71) Applicant: INTERNATIONAL BUSINESS MACHINES CORPORATION, Armonk, NY (US)

(72) Inventors: Carlos F. Fuente, Winchester (GB); John E. Lindley, San Jose, CA (US); William J. Scales, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,628

(22) Filed: Jul. 20, 2016

(65) Prior Publication Data
US 2016/0328167 A1 Nov. 10, 2016

Related U.S. Application Data

(63) Continuation of application No. 13/481,368, filed on May 25, 2012, now Pat. No. 9,432,311, which is a
(Continued)

(51) Int. Cl.
*G06F 3/00* (2006.01)
*G06F 13/28* (2006.01)
(Continued)

(52) U.S. Cl.
CPC ............ *G06F 3/0619* (2013.01); *G06F 3/065* (2013.01); *G06F 3/067* (2013.01); *H04L 49/90* (2013.01); *G06F 3/0656* (2013.01)

(58) Field of Classification Search
CPC ..... H04L 67/1097; H04L 45/00; H04L 49/70; H04L 63/10; H04L 67/10; H04L 67/1002;
(Continued)

(56) References Cited

U.S. PATENT DOCUMENTS 4,428,064 A 1/1984 Hempy et al.
4,488,004 A 12/1984 Bogart et al.
(Continued)

OTHER PUBLICATIONS

"Storage Area Network," printed from https://en.wikipedia.org/w/index.php?title=Storage_area_network&oldid=390366433, Wikipedia, the free encyclopedia, Oct. 16, 2009 (3 pages).
(Continued)

*Primary Examiner* — Idriss N Alrobaye
*Assistant Examiner* — Henry Yu
(74) *Attorney, Agent, or Firm* — Griffiths & Seaton PLLC

(57) ABSTRACT

An apparatus, method and computer program in a distributed cluster storage network comprises storage control nodes to write data to storage on request from a host; a forwarding layer at a first node to forward data to a second node; a buffer controller at each node to allocate buffers for data to be written; and a communication link between the buffer controller and the forwarding layer at each node to communicate a constrained or unconstrained status indicator of the buffer resource to the forwarding layer. A mode selector selects a constrained mode of operation requiring allocation of buffer resource at the second node and communication of the allocation before the first node can allocate buffers and forward data, or an unconstrained mode of operation granting use of a predetermined resource credit provided by the second to the first node and permitting forwarding of a write request with data.

12 Claims, 6 Drawing Sheets

Related U.S. Application Data continuation of application No. 13/363,505, filed on Feb. 1, 2012, now Pat. No. 9,461,944.

(51) Int. Cl.
*G06F 5/00* (2006.01)
*G06F 15/167* (2006.01)
*G01R 31/08* (2006.01)
*H04L 12/28* (2006.01)
*H04L 12/56* (2006.01)
*G06F 12/00* (2006.01)
*G06F 3/06* (2006.01)
*H04L 12/861* (2013.01)

(58) Field of Classification Search
CPC ............. H04L 67/1008; H04L 12/1886; H04L 45/586; H04L 49/9078; H04L 63/0218; H04L 67/101; G06F 3/067; G06F 3/0689; G06F 3/0664; G06F 11/1464
USPC ............ 710/6, 15, 22–23, 52; 709/212, 247; 370/230, 254, 392, 408; 711/113, 154
See application file for complete search history.

(56) References Cited

U.S. PATENT DOCUMENTS

| | | |
|---|---|---|
| 5,224,100 A | 6/1993 | Lee et al. |
| 6,421,687 B1 | 7/2002 | Klostermann |
| 6,678,740 B1 | 1/2004 | Rakib et al. |
| 6,791,949 B1 | 9/2004 | Ryu et al. |
| 8,107,397 B1 | 1/2012 | Bagchi et al. |
| 2003/0126223 A1 | 7/2003 | Jenne et al. |
| 2003/0169736 A1 | 9/2003 | Lavigne et al. |
| 2007/0226428 A1 | 9/2007 | Tremaine et al. |
| 2010/0161843 A1 | 6/2010 | Spry |

OTHER PUBLICATIONS

Meggyesi, "Fibre Channel Overview," Internet Citation, retrieved from http://web.archive.org/web/19971211315625/www1.cern.ch/HSI/fcs/spec/overview.htm, Aug. 15, 1994 (10 pages).

DYNAMIC RESOURCE ALLOCATION FOR DISTRIBUTED CLUSTER-STORAGE NETWORK

CROSS-REFERENCE TO RELATED APPLICATION

This Application is a Continuation of U.S. patent application Ser. No. 13/481,368, filed May 25, 2012, which is a Continuation of U.S. patent application Ser. No. 13/363,505, filed Feb. 1, 2012, which claims priority to PCT International Application No. PCT/EP2010/062496, filed Aug. 26, 2010, which claims priority benefit from European Patent Application No. 09173428.5, filed on Oct. 19, 2009, entitled "Dynamic Resource Allocation for Distributed Cluster Storage Network".

TECHNICAL FIELD

The present invention relates to storage controller systems, and in particular those implemented as a distributed cluster involving multiple nodes, and embedding a caching function, such as, for example, the IBM® SAN Volume Controller (IBM is a Registered Trademark of IBM Corporation in the United States, other countries, or both).

BACKGROUND OF THE INVENTION

The present invention centres on the interaction of two functions in this system—the forwarding layer and the cache used to provide write buffer resource—and how those functions handle I/O requests. A description of these is needed for an understanding of the invention.

The forwarding layer allows an I/O request to be received on any node in the system, and for that request to be forwarded to another node that will actually be responsible for servicing that request. In systems which can scale to include many nodes, this technique is commonly used to allow the work of the whole system to be shared among the member nodes, and to allow each of the nodes to only be concerned about a subset of the work of the whole system. This technique allows simpler algorithms to be used, and these algorithms also tend to scale to be operable in bigger systems more readily. Contrast this with algorithms that allow any node in the system to process any request, particularly where those requests need to be processed coherently with respect to other requests received on other nodes of the system. When handling a forwarded I/O request, the forwarding node generally still remains involved in the I/O process. In particular, the forwarding node is still responsible for performing the data transfer to/from the host, and sending completion status to the host, even though the forwarded-to node is the source and/or sink of that data and status, according to its handling of the I/O request. It is sometimes possible to hand-off the request entirely, so that once the request is forwarded, the forwarding node has no further responsibility towards it, and the exchange becomes one purely between the request originator and the forwarded-to node. But this feature is not always possible, because of constraints imposed by the fabric infrastructure connecting the originator hosts and the forwarding/forwarded-to nodes, and/or constraints in the adapter technology that interfaces the forwarding node with that fabric.

The process for a write command in particular requires the forwarding node to request a transfer of the data from the host into a buffer within that node, and then transmit the contents of that buffer to a further buffer within the forwarded-to node. One scheme for achieving this transfer involves the following steps (with reference to FIG. 2):

200. Host transmits I/O write request to first node
202. First (forwarding) node forwards request to second (forwarded-to) node
204. Second node decides to process, allocates buffer in which to receive data, and sends request for data to first node
206. First node allocates buffer, and sends request for data to host
208. Host transmits data, and data is received in first node in buffer defined at 206
210. First node is notified of completion of data transfer, and starts data transfer to second node in buffer defined at 204
212. Second node is notified of data transfer completion, and resumes processing of write I/O request using received data Note that the pre-allocation of buffers into which to receive data is an important requirement of operation in a storage network, such as one based on FibreChannel. Note also that these buffers are relatively expensive, which means they need to be explicitly assigned to an I/O request as it is processed, rather than being presumed to be available. Hence, in the sequence above, the host does not transmit the write data with the request at 200; instead it waits until it is asked for the data at 206. Similarly, the forwarding node does not send the data until the forwarded-to node asks for it. This behaviour helps to prevent congestion arising in the fabric, where data is transmitted but cannot be received because of a lack of buffering at the receiver, and is an important feature that tends to distinguish how data transfers are performed within storage networks from how they are performed in conventional ones.

One consequence of the scheme above though, is that the whole I/O process involves more steps, and takes longer from start to finish, as compared to the equivalent process where the I/O is handled entirely within the first node, comprising the following steps (with reference to FIG. 3):

300. Host transmits I/O write request to first node
302. First node decides to process, allocates buffer in which to receive data, and sends request for data to host
304. Host transmits data, and data is received in first node in buffer defined at 302.
306. First node is notified of completion of data transfer, and resumes processing of write I/O request using received data The extra ready for data exchange can have a significant impact on the total processing time experience by the host, possibly as much as trebling the time it has to wait for the I/O request (as compared with the local processing case), and this can have a significant cost in terms of overall system performance.

The following sequence of steps can be used to mitigate this extra processing time (with reference to FIG. 4):

400. Host transmits I/O write request to first node
402. First node allocates buffer, and sends request for data to host
404. Host transmits data, and data is received in first node in buffer defined at 402
406. First (forwarding) node forwards request with data to second (forwarded-to) node
408. Second node processes I/O request using the received data The above sequence avoids an extra exchange of messages between first and second nodes to effect the data transfer during the I/O process, which significantly improves the situation compared to the first sequence. This more streamlined process does need some extra work to be performed before the I/O is processed, so as to honour the requirement that there is buffer space to perform the data transfer at 306. The forwarded-to node must transfer a permission, commonly termed a 'credit', to the forwarding node, which permits it to transmit a certain amount of write data in the future, and the forwarding node must be in receipt of such credit, before it performs that transmission. The transmission consumes the credit, and so as the forwarded-to node executes and completes an I/O process, and buffer space becomes free again, it must create further credit and transmit it to the forwarding node in anticipation of further I/O.

The cache function within caching controllers such as the IBM SAN Volume Controller (hereinafter "SVC") implements a non-volatile write cache, whereby it will process a write I/O by placing the request's data in non-volatile memory (most often within two nodes), and immediately completes the host I/O. At some later time, it will 'destage' the data, which involves sending a write command for that data to the disk which is the normal location for that data. When acknowledgement for that write command is received, the data can be removed from the non-volatile memory contents. The host perceives a much smaller response time for its I/O request than it would see if the request were sent directly to the disk, improving system performance. Non-volatile cache is suitably adapted to the provision of write buffer resource in data storage systems.

It is very common though to avoid issuing this write straight away. A number of advantages can be achieved through this. For example, if the host subsequently sends a further write I/O request for the same location, then that new write I/O request can be processed by replacing the existing data with the data from the later write. At some future time, when a destage write is performed, only the most recent revision of data need to be sent to the disk, saving on the number of disk operations that are performed.

Another important benefit is that when a host application generates a large burst of write I/O, this can be accepted into the non-volatile write cache quickly, and the burst of I/O is forwarded to the disk which might take much longer to process the entire burst. Therefore, the host's burst of work is completed much more quickly than would be the case if it were required to wait for the disk, again improving system performance.

However, this scheme can cause problems if the host workload exceeds the ability of the backing disk subsystem for a long period of time. This can happen for instance where a disk subsystem suffers a failure, and enters a degraded performance mode. In this case, the cache memory space within the controller can become exhausted, and in this case write I/O processing must wait for space to be made available from the completion of a destage write. Many of these writes will actually need to wait for the slow controller to process a write I/O (because it is the slow controller that is consuming the majority of the write cache), and so it is possible for all I/O being processed to become backlogged by slow I/O processing in just one backing disk.

The solution to this problem is to limit the amount of cache memory that can be consumed by any one backing disk subsystem. When this scheme operates, I/Os do not automatically get granted buffer space when they are received. In particular, if the write I/O is destined for a disk that is judged to have already consumed its fair share of system resources, then processing of that write I/O is suspended until the share of system resources consumed by that disk and/or its ability to process I/O changes, so it is judged that it is entitled to be granted further resource. In the meantime, other I/O requests that are being processed to disk subsystems which are processing I/O acceptably and are consuming less than the amount of resource than they are entitled to are allowed to continue.

The cache function implemented within SVC is typical of those of many caching controllers, in that for any given host volume (vdisk) it can support I/O on only one or two nodes of the system. The forwarding layer is used 'above' the cache layer, (so that the forwarding layer processes a given host I/O before the cache layer), and so this allows all nodes in the system to receive I/O for a vdisk, and that I/O is then forwarded to one of the up to two nodes that is able to process that I/O.

Observe now what can happen when the optimised forwarding scheme above interacts with the cache partitioning algorithm described. The optimised forwarding scheme allocates relatively scarce buffering resource ahead of time, before the cache algorithm is able to judge whether the disk subsystem has consumed more than its fair share of resource. If the cache algorithm acts to delay I/O processing, it stops the I/O from consuming more cache resource, but that I/O request has already consumed buffer space within the forwarding node. This can quickly lead to the forwarding node running out of buffer space to service any I/O request. This means that the same problem has arisen as was attempted to be solved by the cache partitioning scheme, though the exhaustion here is suffered in the forwarding buffer resource of the forwarding node, rather than the cache buffer resource of the forwarded-to node.

The slower forwarding algorithm outlined above with reference to FIG. 2 does not exhibit this problem. It waits for the cache to decide to process the I/O before committing buffer resource to the request at step 204, and so it only allocates buffer resource to I/Os whose disk subsystem is judged to deserve more resource. But this scheme greatly increases the processing time for the I/O.

What is needed is a technique by which forwarded write I/Os can be processed with minimum response time, but without leading to problems from resource exhaustion when a subset of those I/Os is running slowly.

SUMMARY OF INVENTION

The present invention accordingly provides, in a first aspect, an apparatus operable in a distributed cluster storage network having a host computer system and a storage subsystem, comprising: a plurality of storage control nodes each operable to write data to storage responsive to a request from said host computer system; a forwarding layer at a first of said plurality of storage control nodes operable to forward data to a second of said plurality of storage control nodes; a buffer control component at each of said plurality of storage control nodes operable to allocate buffer resource for data to be written to said storage; and a communication link between said buffer control component and said forwarding layer at each of said plurality of storage control nodes operable to communicate a constrained status indicator of said buffer resource to said forwarding layer.

The apparatus may further comprise a mode selector component responsive to receiving said constrained status indicator at said forwarding layer for selecting a constrained mode of operation of a write, said constrained mode of operation requiring allocation of buffer resource at said second storage control node and communication of said allocation before said first storage control node becomes operable to allocate buffer resource for said data and to forward said data. Preferably, said communication link between said buffer control component and said forwarding layer at each of said plurality of storage control nodes is further operable to communicate an unconstrained status indicator of said buffer resource to said forwarding layer. Preferably, said mode selector component is responsive to receiving said unconstrained status indicator at said forwarding layer for selecting an unconstrained mode of operation of a write, said unconstrained mode of operation granting use of a predetermined resource credit provided by said second to said first of said storage control nodes and permitting forwarding of a write request with said data from said first to said second of said storage control nodes. Preferably, said distributed cluster storage network comprises a storage virtualization controller.

In a second aspect, there is provided a method of operating a distributed cluster storage network having a host computer system and a storage subsystem, comprising the steps of: receiving at a first of said plurality of storage control nodes a request to write data to storage from said host computer system; forwarding said data by a forwarding layer at said first of said plurality of storage control nodes to a second of said plurality of storage control nodes; allocating buffer resource for data to be written to said storage by a buffer control component at each of said plurality of storage control nodes; and communicating a constrained status indicator of said buffer resource to said forwarding layer.

The method may further comprise, responsive to receiving said constrained status indicator at said forwarding layer, selecting a constrained mode of operation of a write, said constrained mode of operation requiring allocation of buffer resource at said second storage control node and communication of said allocation before said first storage control node becomes operable to allocate buffer resource for said data and to forward said data. The method may further comprise communicating an unconstrained status indicator of said buffer resource to said forwarding layer using a communication link between said buffer control component and said forwarding layer. The method may further comprise, responsive to receiving said unconstrained status indicator at said forwarding layer, selecting an unconstrained mode of operation of a write, said unconstrained mode of operation granting use of a predetermined resource credit provided by said second to said first of said storage control nodes and permitting forwarding of a write request with said data from said first to said second of said storage control nodes. Preferably, operating said distributed cluster storage network comprises operating a storage virtualization controller.

In a third aspect, there is provided a computer program comprising computer program code to, when loaded into a computer system and executed thereon, cause said computer system to perform all the steps of a method according to the second aspect.

A preferred embodiment of the present invention thus introduces a new communication between the buffer control and forwarding layers. In essence the cache function transmits a status which indicates whether a particular set of I/Os are being processed expeditiously, or whether they are being delayed because of a backlog in the underlying subsystem. This indication is transmitted to all nodes, and is used on those nodes to control how the forwarding layer processes write requests.

Where the forwarding layer is informed the I/Os are being processed without delays, then it will use the quicker scheme, immediately allocating a buffer and requesting the data from the host, and it will forward the data along with the I/O request to minimise the extra processing time.

Where the forwarding layer is informed that I/Os are being delayed in processing, then it will forward just the request message, and only allocate a buffer when it receives the explicit request for the data, which also acts as the indication that that particular I/O process has been granted resource and merits processing.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

In a preferred SVC embodiment, the buffer control component responsible for providing buffer resource from non-volatile cache maintains status on a per-vdisk (host volume) level which indicates whether that vdisk is running in the 'constrained resource' mode—so that resources are known to be depleted, or whether the vdisk is permitted to run in an 'unconstrained resource' mode with respect to allocating resources for new host I/O.

The SVC clustering infrastructure is used to communicate this status to the forwarding layer, on all nodes. Within each node the forwarding layer uses this status to decide between two completely separate paths for handling write I/O, where forwarding is required. (Where the node that received the host I/O is also one of the nodes on which the cache function is able to operate, then the I/O is passed to cache without any buffers being allocated by the forwarding layer at all, and the algorithm here is not required).

Figure 1:
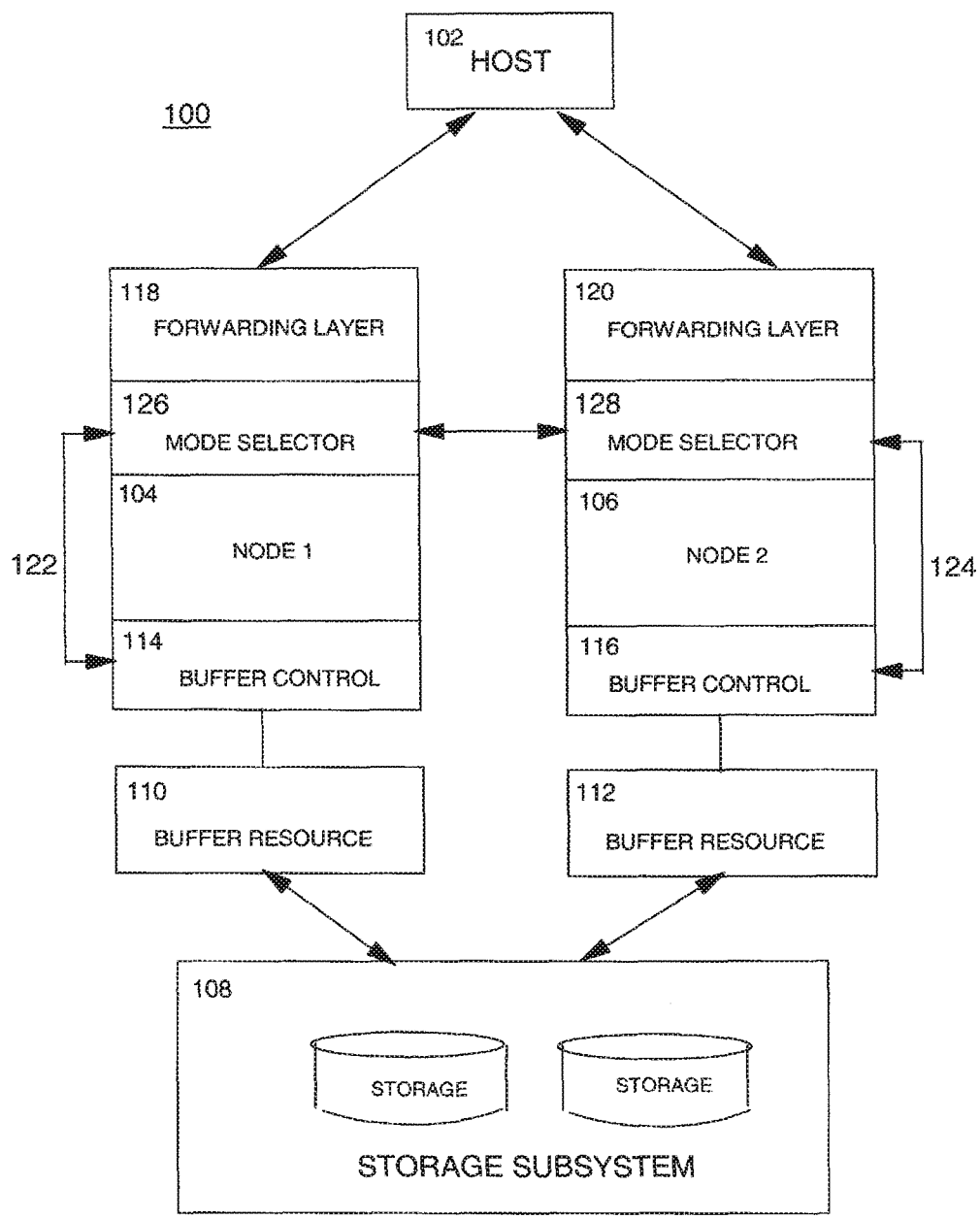
FIG. 1 shows an arrangement of apparatus in accordance with a preferred embodiment of the invention.
Figure 2:
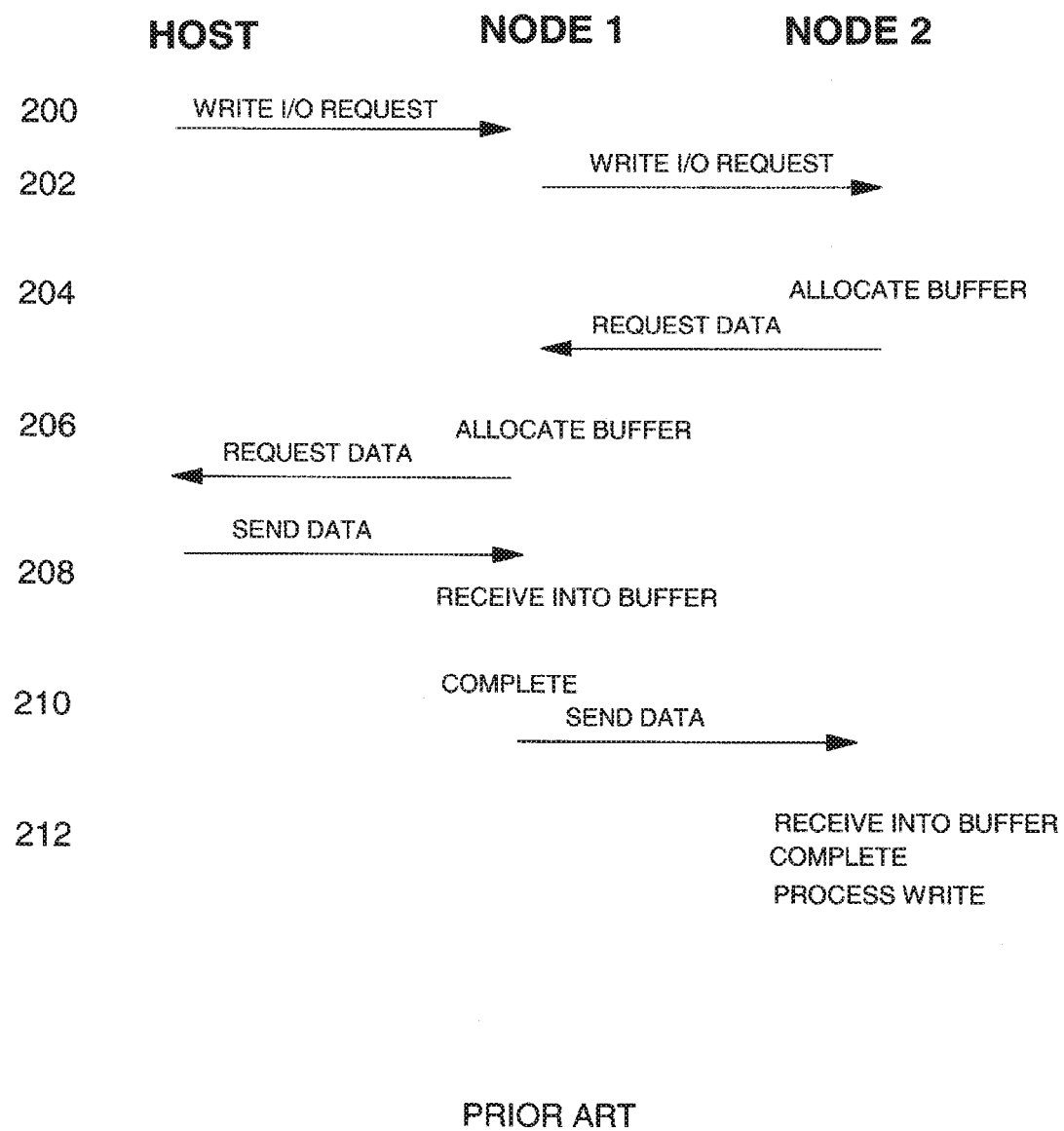
FIGS. 2 to 4 show the steps of a method of operation according to the prior art.
Figure 3:
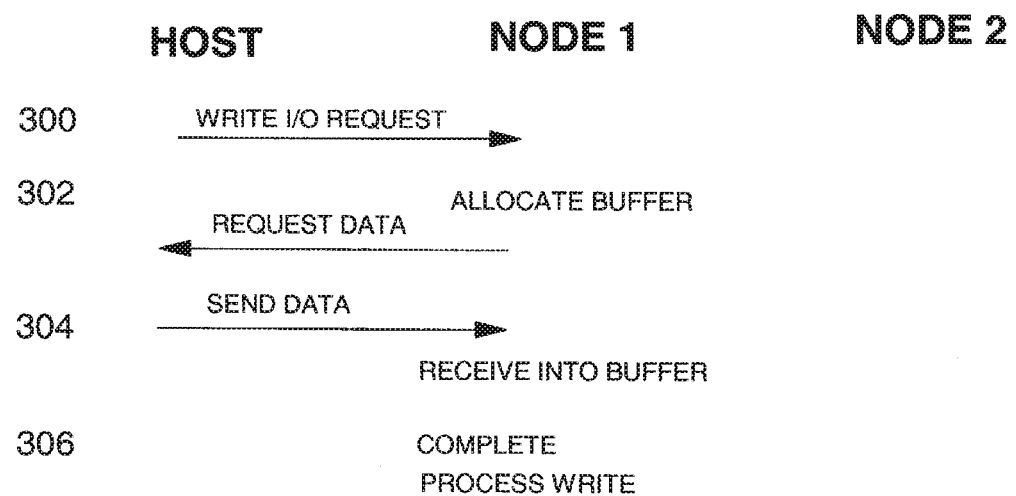
Figure 4:
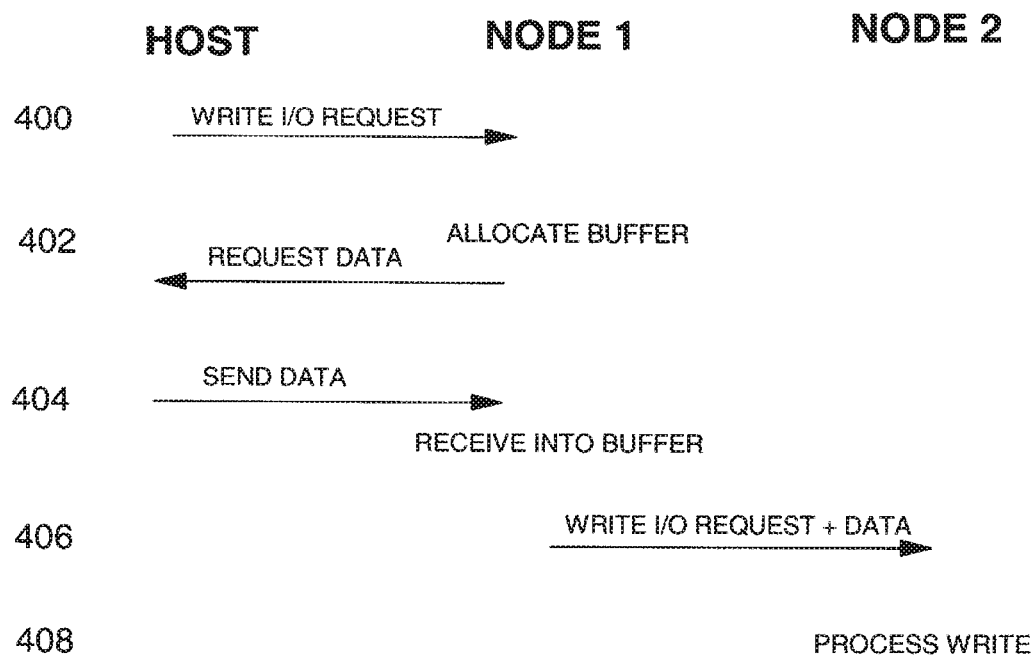

Turning to FIG. 1, there is shown a system 100 comprising a host 102 operable to communicate with a pair of storage control nodes (NODE 1, NODE 2) 104, 106 to write data from host 102 to storage held in storage subsystem 108. Storage control nodes 104, 106 are operable to make use of buffer resources 110, 112 to hold write data prior to destaging to storage held by storage subsystem 108. Storage control nodes 104, 106 further comprise forwarding layers 118, 120, which are operable to forward write data. Storage control nodes 104, 106 further comprise buffer control components 114, 116 to control the buffer resources 110, 112. Buffer resources 110, 112 are from time to time subject to resource constraint. Storage control nodes 104, 106 are provided with communication links 122, 124 between buffer control components 114, 116 and forwarding layers 118, 120 to communicate indicators indicating whether one or more of buffer resources 110, 112 is currently subject to resource constraint, or in the alternative, indicating that one or more of buffer resources 110, 112 is not currently suffering from such resource constraint. Forwarding layers 118, 120 are further provided with mode selectors 126, 128 to select a mode of operation responsive to the receipt of the indicators over communication links 122, 124 to select between a 'constrained resource' mode of operation and an 'unconstrained resource' mode of operation.

Figure 5:
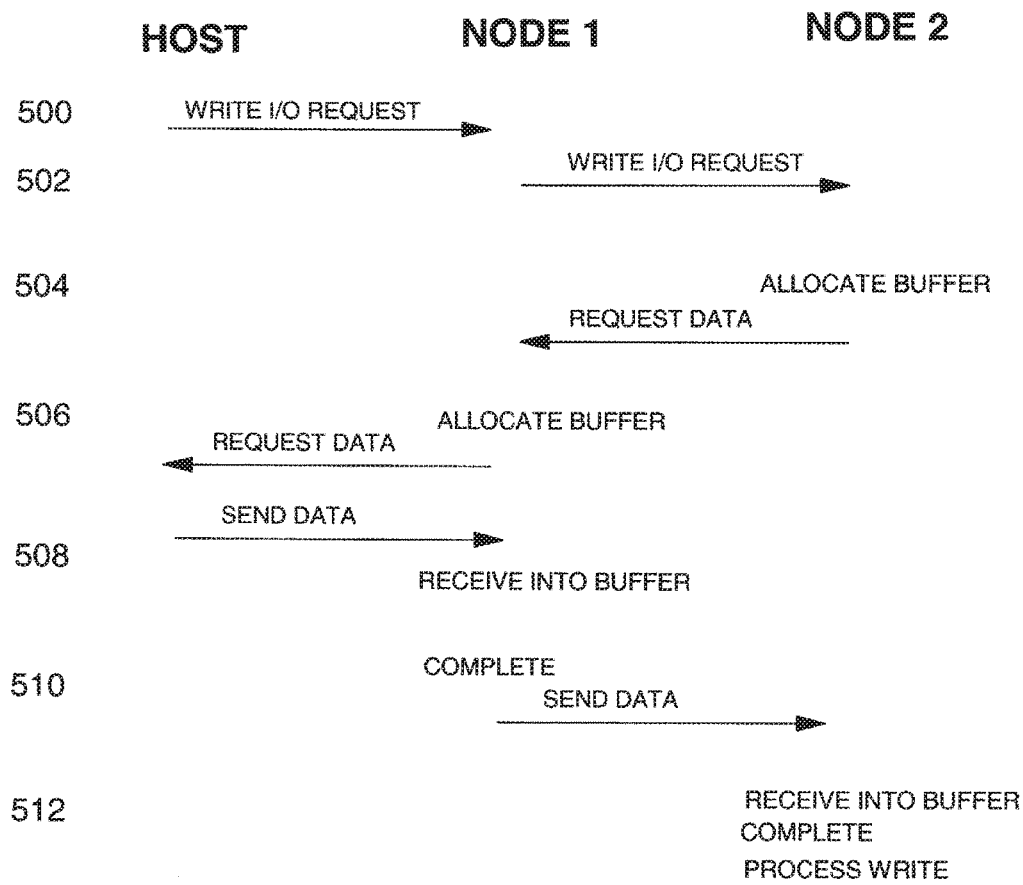
FIGS. 5 and 6 show the steps of a method of operation according to a preferred embodiment of the invention.

In 'constrained resource' mode, the flow is (with reference to FIG. 5):

500. Host transmits I/O write request to first node

502. First (forwarding) node forwards request to second (forwarded-to) node which contains the cache function able to process I/O for that vdisk 504. Second node's cache layer decides to process, allocates buffer in which to receive data, and sends request for data to first node 506. First node allocates buffer, and sends request for data to host 508. Host transmits data, and data is received in first node in buffer defined at 506

510. First node is notified of completion of data transfer, and starts data transfer to second node in buffer defined at 504

Figure 6:
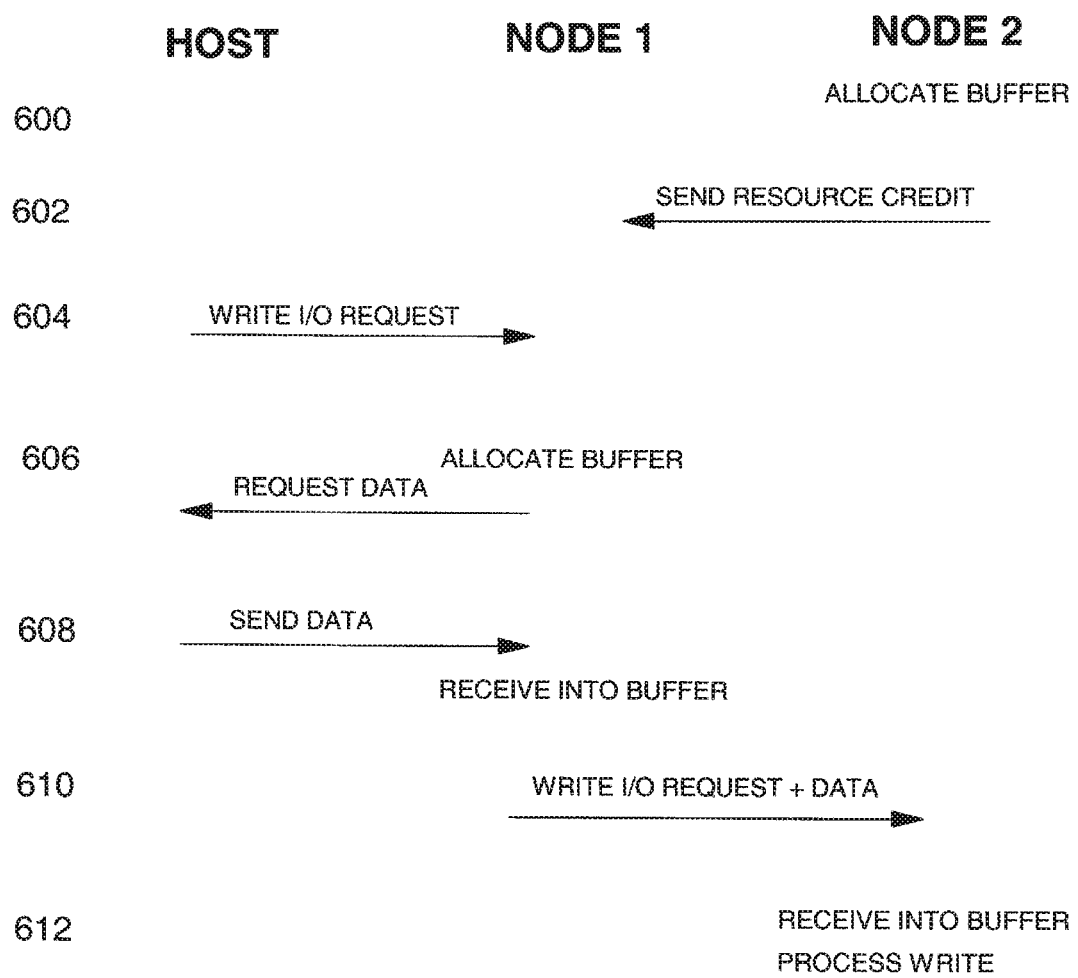

512. Second node is notified of data transfer completion, and the cache layer resumes processing of write I/O request using received data In 'unconstrained resource' mode, there is an additional setup flow before I/O is processed (with reference to FIG. 6):

600. Second (forwarded-to) node allocates some buffer resource

602. Second node transmits credits to first (forwarding) node entitling that node to transmit a defined amount of write data Then, the following write I/O flow is performed when the I/O is actually received:

604. Host transmits I/O write request to first node

606. First node allocates buffer, and sends request for data to host

608. Host transmits data, and data is received in first node in buffer defined at 606

610. First (forwarding) node forwards request with data to second (forwarded-to) node which contains the cache function able to process I/O for that vdisk 612. Second node is notified of receipt of I/O request and data, and cache layer processes I/O request using the received data.

On completion of the I/O request, the freed buffer resource is used to repeat the setup cycle and provide new credit to the forwarding node for future I/O.

The credit messages can most optimally be piggy-backed on other messages that flow in the same direction to minimise overhead caused by these. The resources used by the flows need to be sufficiently separate, to avoid deadlock arising from different paths allocating the same resources in different orders, as would be clear to one of ordinary skill in the art of distributed I/O systems.

It will be clear to one of ordinary skill in the art that the preferred embodiment of the present invention is industrially applicable in providing advantageous efficiencies in the operation of distributed cluster storage networks.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method of operating a distributed cluster storage network having a host computer system and a storage subsystem, by a processor device, comprising:
   receiving at a first of said plurality of storage control nodes a request to write data to storage from said host computer system;
   forwarding said data by a forwarding layer at said first of a plurality of storage control nodes to a second of said plurality of storage control nodes;
   allocating buffer resource for data to be written to said storage by a buffer control component at each of said plurality of storage control nodes; and
   communicating a constrained and unconstrained status indicator of said buffer resource to said forwarding layer, the status indicator communicating an indication of when a particular set of input/output (I/O) operations are being processed expeditiously and when the particular set of I/O operations are under delay.

2. The method according to claim 1, further comprising, responsive to receiving said constrained status indicator at said forwarding layer, selecting a constrained mode of operation of a write, said constrained mode of operation requiring allocation of buffer resource at said second storage control node and communication of said allocation before said first storage control node becomes operable to allocate buffer resource for said data and to forward said data.

3. The method according to claim 1, further comprising, responsive to receiving said unconstrained status indicator at said forwarding layer, selecting an unconstrained mode of operation of a write, said unconstrained mode of operation granting use of a predetermined resource credit provided by said second to said first of said storage control nodes and permitting forwarding of a write request with said data from said first to said second of said storage control nodes.

4. The method according to claim 1, wherein operating said distributed cluster storage network comprises operating a storage virtualization controller.

5. An apparatus operable in a distributed cluster storage network having a host computer system and a storage subsystem having a plurality of storage control nodes each operable to write data to storage responsive to a request from said host computer system, comprising:
   a forwarding layer at a first of said plurality of storage control nodes operable to forward data to a second of said plurality of storage control nodes;
   a buffer control component at each of said plurality of storage control nodes operable to allocate buffer resource for data to be written to said storage; and
   a communication link between said buffer control component and said forwarding layer at each of said plurality of storage control nodes operable to communicate a constrained and unconstrained status indicator of said buffer resource to said forwarding layer, the status indicator communicating an indication of when a particular set of input/output (I/O) operations are being processed expeditiously and when the particular set of I/O operations are under delay.

6. The apparatus according to claim 5, further comprising a mode selector component responsive to receiving said constrained status indicator at said forwarding layer for selecting a constrained mode of operation of a write, said constrained mode of operation requiring allocation of buffer resource at said second storage control node and communication of said allocation before said first storage control node becomes operable to allocate buffer resource for said data and to forward said data.

7. The apparatus according to claim 6, said mode selector component responsive to receiving said unconstrained status indicator at said forwarding layer for selecting an unconstrained mode of operation of a write, said unconstrained mode of operation granting use of a predetermined resource credit provided by said second to said first of said storage control nodes and permitting forwarding of a write request with said data from said first to said second of said storage control nodes.

8. The apparatus according to claim 5, wherein said distributed cluster storage network comprises a storage virtualization controller.

9. A computer program product for operating a distributed cluster storage network in a computing environment by a processor device, the computer program product comprising a non-transitory computer-readable storage medium having computer-readable program code portions stored therein, the computer-readable program code portions comprising:
   an executable portion that receives at a first of said plurality of storage control nodes a request to write data to storage from said host computer system;
   an executable portion that forwards said data by a forwarding layer at said first of a plurality of storage control nodes to a second of said plurality of storage control nodes;
   an executable portion that allocates buffer resource for data to be written to said storage by a buffer control component at each of said plurality of storage control nodes; and
   an executable portion that communicates a constrained and unconstrained status indicator of said buffer resource to said forwarding layer, the status indicator communicating an indication of when a particular set of input/output (I/O) operations are being processed expeditiously and when the particular set of I/O operations are under delay.

10. The computer program product according to claim 9, further comprising an executable portion that, responsive to receiving said constrained status indicator at said forwarding layer, selects a constrained mode of operation of a write, said constrained mode of operation requiring allocation of buffer resource at said second storage control node and communication of said allocation before said first storage control node becomes operable to allocate buffer resource for said data and to forward said data.

11. The computer program product according to claim 9, further comprising an executable portion that, responsive to receiving said unconstrained status indicator at said forwarding layer, selects an unconstrained mode of operation of a write, said unconstrained mode of operation granting use of a predetermined resource credit provided by said second to said first of said storage control nodes and permitting forwarding of a write request with said data from said first to said second of said storage control nodes.

12. The computer program product of claim 9, wherein operating said distributed cluster storage network comprises operating a storage virtualization controller.

* * * * *